United States Patent [19]

Lim et al.

[11] Patent Number: 5,457,625

[45] Date of Patent: Oct. 10, 1995

[54] MAXIMIZING PROCESS PRODUCTION RATES USING PERMANENT CONSTRAINTS

[75] Inventors: Kian Y. Lim, Corpus Christi; Henry B. McAnally, III, Cypress; William B. Stewart, Jr., Kingwood, all of Tex.

[73] Assignee: The M. W. Kellogg Company, Houston, Tex.

[21] Appl. No.: 226,911

[22] Filed: Apr. 13, 1994

[51] Int. Cl.[6] .................................................. G05B 13/02
[52] U.S. Cl. ........................ 364/149; 364/150; 364/153; 364/164; 364/165
[58] Field of Search .................................. 364/149, 150, 364/153, 158, 164, 165, 159

[56] References Cited

U.S. PATENT DOCUMENTS

| | | | |
|---|---|---|---|
| 4,349,869 | 9/1982 | Prett et al. | 364/159 |
| 4,423,594 | 1/1984 | Ellis | 364/149 |
| 4,577,270 | 3/1986 | Sugano et al. | 364/151 |
| 4,578,747 | 3/1986 | Hideg et al. | 364/151 |
| 4,616,308 | 10/1986 | Morshedi et al. | 364/159 |
| 4,630,189 | 12/1986 | Ohmori et al. | 364/150 |
| 4,736,316 | 4/1988 | Wallman | 364/149 |
| 5,043,863 | 8/1991 | Bristol et al. | 364/151 |

OTHER PUBLICATIONS

Bashein, G., "A Simplex Algorithm for On–Line Computation of Time Optimal Controls," *IEEE Proc.*, pp. 479–482 (May 1971).

Birta, L. G. et al., "An Optimal Control Algorithm Using the Davidson–Fletcher–Powell Method with the Fibonacci Search," *AICHE Journal*, vol. 16, No. 3, pp. 363–368 (May 1970).

Lesser, H. A. et al., "The Time–Optimal Control of Discrete–Time Linear Systems with Bounded Controls," *AICHE Journal*, vol. 12, No. 1, pp. 143–152 (Jan. 1966).

Richalet, J., et al., "Model Predictive Heuristic Control: Applications to Industrial Processes," *Automatica*, vol. 14, pp. 413–428 (1978).

Weber, A. P. J. et al., "Suboptimal Control of Nonlinear Systems: I Unconstrained and II. Constrained," *AICHE Journal*, vol. 17, No. 3, pp. 641–658 (1971).

Yem, Y. et al., "Dynamic Multivariable Constraint Control—Applications to Petrochemistry," *Proceedings of the 1st Al–Fatah/IFAC Workshop*, Tripoli, Libya, May 12–16, 1980, ISBN No. 0–08–028698–4, pp. 39–47.

Cutler, C. R. et al., "Dynamic Matrix Control—A Computer Control Algorithm," American Institute of Chemical Engineers, 86th National Conference, pp. 1–24.

Morshedi, A. M. et al., "Optimal Solution of Dynamic Matrix Control with Linear Programming Techniques (LDMC)," *Proceedings of the Instrument Society of America 1985 Conference*, Philadelphia, Pa., Oct. 21–24, pp. 199–208.

Grosdidier, Pierre et al., "FCC Unit Reactor–Regenerator Control," *1992 American Control Conference Proceedings*, Paper No. WA4, pp. 117–121.

*Primary Examiner*—Paul P. Gordon
*Attorney, Agent, or Firm*—The M. W. Kellogg Company

[57] ABSTRACT

The present invention optimizes the relationship of variables associated with a process having inputs and outputs such that the process has controlled variables, manipulated variables, associated variables and disturbance variables, to maximize production rates. The method of optimizing the relationship includes the steps of prioritizing errors associated with the controlled variables, optimizing controlled variable deviations from their setpoints over a predetermined future time horizon based upon manipulated variable differential moves, suppressing errors associated with the future controlled variable while penalizing moves having large manipulated variable movement for balancing the reduction of future control error against large manipulated variable movement, weighting the manipulated variables for reducing deviation of the manipulated variable from a predetermined target value set artificially high so as to allow preferential movement with respect to some manipulated variables over other manipulated variables, and applying a constraint deviation variable to effectuate deviations outside allowable bounds.

17 Claims, 16 Drawing Sheets

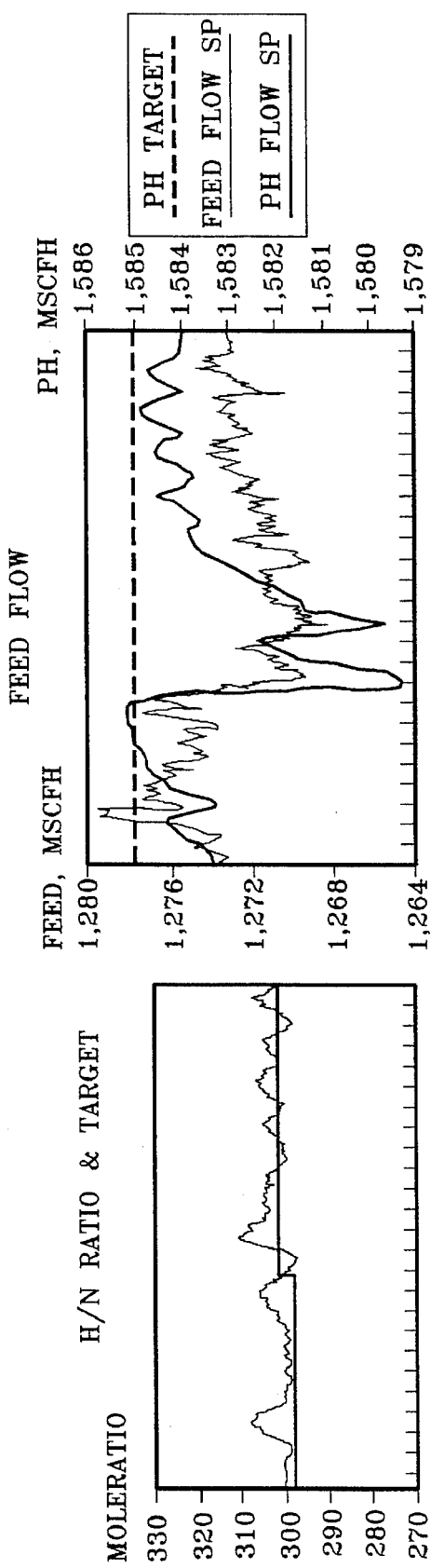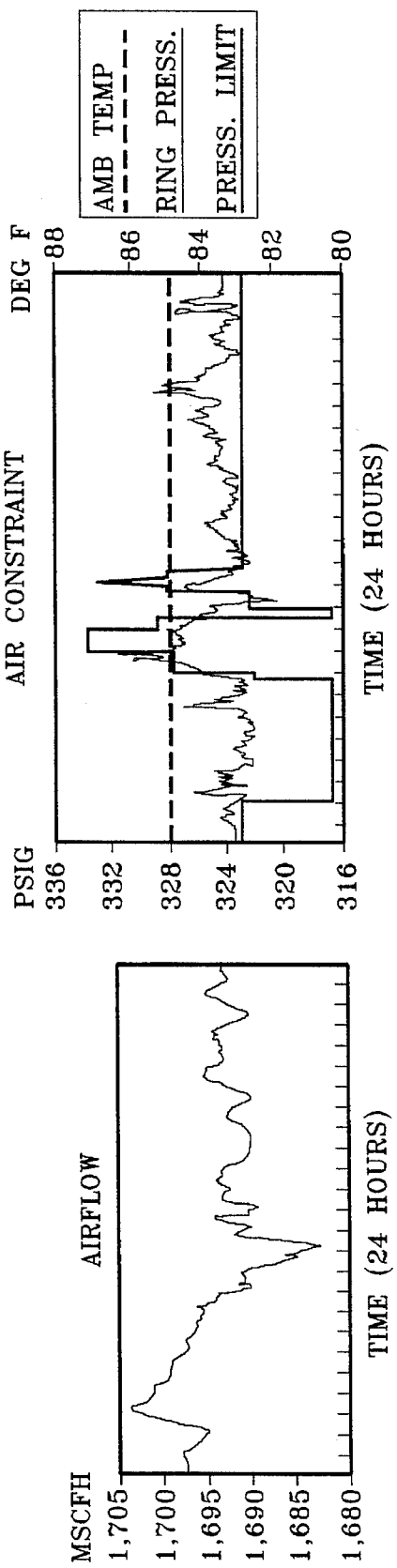
FIG.9(a)
FIG.9(b)
FIG.9(c)
FIG.9(d)

5,457,625

MAXIMIZING PROCESS PRODUCTION RATES USING PERMANENT CONSTRAINTS

FIELD OF THE INVENTION

The present invention relates to a method and apparatus for optimizing the relationship of variables associated with a process for maximizing production rates. More particularly, the present invention relates to a dynamic control method employing a predictive control algorithm that is capable of handling multiple inputs and/or outputs and constraints on manipulated variables and/or other variables associated with the process.

BACKGROUND OF THE INVENTION

Processes can be controlled more precisely to give more uniform and higher quality products by the application of automatic control principles. Insofar as the application of automatic control permits plant operation, as close as feasible, to plant design constraints, and reduces manpower costs and the costs of off-specification product, economic return of invested capital can be increased. Prior to the development of computer computational power, feedback control units used sensors to measure an output variable, variable ratio or the like. The measurements could then be used to adjust the input variable according to a standard control equation, i.e., a transfer function depending on the process. However, the nature of feedback control requires undesirable process deviations to have potentially occurred prior to taking corrective action.

The introduction of fast, efficient computers into process control methodology now permits the implementation of master units receiving a multitude of different types of interdependent process inputs of multiple interdependent process units for which an optimized output can be imposed. Such master control units can achieve a significant degree of feedforward (i. e., predictive) control in very complicated processes since even a complex process control equation can be rapidly solved. Feedforward control becomes important in the optimization of the process since the controller action can be initiated based upon a prediction of where the outputs (i. e., the controlled variables) are headed.

The optimization engine can also efficiently deal with process constraints which are only indirectly influenced if at all by manipulated variables so that the best output signals are tendered for the current conditions. Individual low hierarchy controllers manipulating a single input for control of a single output cannot produce a synthesis of the overall picture. Heretofore, controlling the process associated with a plant has been the purview of the experienced human operator. In a complicated process the appropriate action or actions may not be readily apparent or may not be taken as quickly as desired for optimum operation. Further, the human controller must develop "comfort levels" of operation based on experience and rules of thumb. Comfort levels can vary drastically between different human controllers and can be a significant distance from optimum capability or constraints of the equipment. Such comfort level of operation is necessary to account for the limitations of human data processing.

U.S. Pat. No. 4,349,869 to Prett et al. describes a method for controlling and optimizing the operation of a series of interdependent processes in a plant environment where manipulation of a constrained process input variable is used to achieve feedforward/feedback control of a process output variable. In the method synthesis, input variables are subjected to measured perturbations and the dynamic effects on the outputs are noted for prediction of the future response of the processes during on-line operation.

Grosdidier et al., FCC Unit Reactor-Regenerator Control, 1992 American Control Conference Proceedings, Paper No. WA4, pp. 117–121, describes a multivariable control strategy which was implemented on a fluidized bed catalytic converter (FCC) unit in a European refinery. The FCC unit is said to be a prime candidate for advanced process control due to its complex process behavior and because of the conflict between its operating constraints and its economic objectives.

Of concern in the present invention is to control a process having inputs and outputs and having controlled variables, manipulated variables, associated variables and disturbance variables. Also, it is of concern in the present invention to optimize the relationships of variables in connection with the process having inputs and outputs related to the controlled variables, manipulated variables, associated variables and disturbance variables.

It is, therefore, a feature of the present invention to provide a method for controlling the inputs and outputs of a process having controlled variables, manipulated variables, associated variables and disturbance variables.

It is, also, a feature of the present invention to optimize the relationship of controlled variables, manipulated variables, associated variables and disturbance variables in operative association with inputs and outputs of the process.

A feature of the present invention is to provide a model predictive control algorithm that is capable of handling multiple inputs and/or outputs.

Another feature of the present invention is to provide a model predictive control algorithm that constrains manipulated variables and associated variables.

Another feature of the present invention is to provide a predictive control algorithm that performs feedforward disturbance rejection analysis.

Yet another feature of the present invention is to provide a model predictive control algorithm that uses a dynamic model in the solution of the control problem.

Still another feature of the present invention is to use a dynamic model with the control algorithm that is derived from data in actual plant experiments.

Yet another feature of the present invention is to provide an example of application of the foregoing features to maximize the feed gas flow rate of an ammonia plant subject to a set of constraints specific to the particular plant.

Still another feature of the present invention is to control the hydrogen/nitrogen molar ratio at a synthesis loop in an ammonia plant to a desired target value.

It is a general feature of the present invention to maximize the operating capacity of an ammonia plant by operating the plant at one or more of its equipment or operating constraints.

Yet further, an additional feature of the present invention is to automatically apply production rate maximizing strategies in ammonia plants without manual adjustment of the feed gas to the reformer furnace.

Still another feature of the present invention is to provide the automatic control of ammonia plants by monitoring and controlling equipment and operating constraints.

Still further, another feature of the invention is to maximize production strategies employed in ammonia plants such that typically applied comfort zones can be reduced to minimum levels.

Additional features and advantages of the invention will be set forth in part in the description which follows, and in part will become apparent from the description, or may be learned by practice of the invention. The features and advantages of the invention may be realized by means of the combinations and steps pointed out in the appended claims.

SUMMARY OF THE INVENTION

To achieve the objects, features and advantages, in accordance with the purpose of the invention as embodied and broadly described herein, a method for controlling the inputs and outputs of a process having controlled variables, manipulated variables, associated variables and disturbance variables is provided. The present invention provides a method for optimizing the relationship of variables associated with a process having inputs and outputs. The process has controlled variables, manipulated variables, associated variables and disturbance variables with at least one controlled variable weighted relative to other controlled variables so as to prioritize errors associated with the controlled variables such that controlled variable deviations are optimized with respect to associated setpoints over a predetermined future time horizon based upon manipulated variable differential moves with at least one future controlled variable being penalized for large manipulated variable movement for balancing the reduction of future control error against large manipulated variable movement. The method comprises the steps of weighting at least one manipulated variable for reducing deviation of the manipulated variable from a target value set artificially high to allow preferential movement with respect to some manipulated variables over other manipulated variables, and applying a constraint deviation variable to effectuate deviations outside allowable bounds.

Preferably, the method of the present invention comprises a model predictive controller having a control routine for determining differential moves of manipulated variables based on one or more controlled variables, one or more associated variables, one or more disturbance variables, and a permanent constraint target set at an artificially high value.

More particularly, the method of the present invention provides that the control routine is adapted to solve the objective function:

$$Min\ J = Jcv + J\lambda + Jpc + Jd$$

wherein Min J is a least square value comprising the sum of Jcv, Jλ, Jpc and Jd; such that $$Jcv = Cvwate^T(Ax-e)^T CVwate(Ax-e)$$

wherein Jcv is the sum of a weighted squares of deviations in the controlled variables from respective setpoints over a future time horizon, CVwate is a vector of factors for weighting control variable errors relative to each other, A is a matrix of transfer function coefficients relating the controlled variables to the manipulated variables, x is a vector of the differential moves of the manipulated variables and e is a vector of errors between the controlled variables and respective setpoints; such that $$J\lambda = x^T \lambda^T \lambda x$$

wherein Jλ is the sum of weighted squares of the differential moves of the manipulated variables and λ is a vector of move suppression factors for penalizing excessively large differential moves of the manipulated variables; such that $$Jpc = PCwate(PCtrgt - MVstpt)^T (PCtrgt - MVstpt)$$

wherein Jpc is the sum of the weighted squares of the deviations of the manipulated variables from the permanent constraint target values, PCwate is a vector of factors for specifying how tightly the permanent constraints are enforced, PCtrgt is a vector of the permanent constraint targets, and MVstpt is a vector of the manipulated variable setpoints; such that $$Jd = (d^T AVcost^T)(AVcost\ d)$$

wherein Jd is the sum of the weighted squares of the deviations in constraint functions outside their allowable bounds, d is a vector of constraint deviation variables, and AVcost is a vector of relative constraint weights; wherein the objective function is subject to the limits:

$$0 \leq Vmnmov \leq |x| \leq Vmxmov$$

wherein Vmnmov is a vector of minimum differential moves of the manipulated variables and Vmxmov is a vector of maximum differential moves of the manipulated variables; and $$\left[ \begin{array}{c} MVlwbds \\ \overline{AVlwbds} \end{array} \right] \leq C \left[ \begin{array}{c} x \\ \overline{d} \end{array} \right] \leq \left[ \begin{array}{c} MVhibds \\ \overline{AVhibds} \end{array} \right]$$

wherein MVlwbds are vector elements comprising lower bounds of the manipulated variables, AVlwbds are vector elements comprising lower bounds of the associated variables, C is a matrix of transfer function coefficients relating the manipulated and associated variables to the disturbance variables, MVhibds are vector elements comprising upper bounds of the manipulated variables and AVhibds are vector elements comprising upper bounds of the associated variables.

In a related embodiment, a method for optimizing the relationship of variables associated with a process having inputs and outputs is provided. The process has controlled variables, manipulated variables, associated variables and disturbance variables, such that the method comprises the steps of weighting errors associated with at least one controlled variable relative to other controlled variables so as to prioritize errors associated with the controlled variables, optimizing controlled variable deviations from associated setpoints over a predetermined future time horizon based upon manipulated variable differential moves, suppressing errors associated with at least one future controlled variable by penalizing for large manipulated variable movement for balancing the reduction of future control error against large manipulated variable movement, weighting at least one manipulated variable for reducing deviation of the manipulated variable from a predetermined target value set artificially high so as to allow preferential movement with respect to some manipulated variables over other manipulated variables, and applying a constraint deviation variable to effectuate deviations outside allowable bounds.

The step of optimizing controlled variable deviations can include calculating the sum of the squares of the deviations of the controlled variables with the independent variable being the differential moves of the manipulated variable or, alternately, identifying a preferred move suppression by locating the beginning of an asymptotic decrease of the move sizes prior to a rapid increase in the errors associated with the controlled variable or, alternately, setting upper, lower and incrementing values for a move of the controlled variable or determining detailed output including controlled variable-disturbance variable, controlled variable error, associated variable-disturbance variable, feedforward contributions, manipulated variable moves and manipulated variable setpoint projections.

In yet another embodiment, the present invention provides an ammonia plant comprising a process air compressor for forming a compressed air stream; hydrocarbon, steam and compressed air stream feeds to a reformer for producing a raw syngas stream; means for removing $CO_2$ and residual oxygen compounds from the raw syngas stream to produce a synthesis gas feed stream essentially free of oxygen compounds; a syngas compressor for compressing the synthesis gas feed stream into a synthesis loop comprising in series an ammonia converter for converting nitrogen and hydrogen to ammonia, a refrigeration system for condensing an ammonia product stream, and a recycle line for recirculating unreacted synthesis gas from the refrigeration system to the syngas compressor; a hydrogen recovery unit for recovering a hydrogen recycle stream from a purge stream from the synthesis loop recycle line for recycle to the syngas compressor; and a model predictive controller comprising a control routine for determining differential moves of manipulated variables comprising flow rates of the hydrocarbon and compressed air stream feeds, based on a controlled variable comprising a ratio of nitrogen to hydrogen at an inlet to the ammonia converter, associated variables selected from pressure in the compressed air stream and speed of the process air compressor, disturbance variables selected from ambient air temperature and hydrogen content in the hydrogen recycle stream, and a permanent constraint target comprising an artificially high hydrocarbon feed flow rate. More particularly, the control routine is adapted to solve the objective function:

$$Min\ J=Jcv+J\lambda+Jpc+Jd$$

wherein Min J, Jcv, J$\lambda$, Jpc and Jd are defined above, and the vector PCtrgt includes at least one artificially high value such that Jpc is nonzero.

In still another embodiment, the present invention provides a method for controlling an ammonia plant comprising using a model predictive controller to determine differential moves of manipulated variables and control at least one variable subject to associated variables and disturbance variables, and effecting the differential moves. The ammonia plant to be controlled generally comprises a process air compressor for forming a compressed air stream; hydrocarbon, steam and compressed air stream feeds to a reformer for producing a raw syngas stream; means for removing $CO_2$ and residual oxygen compounds from the raw syngas stream to produce a synthesis gas feed stream essentially free of oxygen compounds; a syngas compressor for compressing the synthesis gas feed stream into a synthesis loop comprising in series an ammonia converter for converting nitrogen and hydrogen to ammonia, a refrigeration system for condensing an ammonia product stream, and a recycle line for recirculating unreacted synthesis gas from the refrigeration system to the syngas compressor; and a hydrogen recovery unit for recovering a hydrogen recycle stream from a purge stream from the synthesis loop recycle line for recycle to the syngas compressor. Particularly, the improvement of the present invention comprises solving the objective function:

$$Min\ J=Jcv+J\lambda+Jpc+Jd$$

wherein Min J, Jcv, J$\lambda$, JPC and JD are as described above.

Yet still further, the present invention provides a process for making ammonia comprising the steps of: compressing air in a compressor to form a stream of compressed air; feeding steam, a hydrocarbon stream and the compressed air stream to a reformer to produce a raw syngas stream; removing $CO_2$ and residual oxygen compounds from the raw syngas stream to produce a syngas feed stream essentially free of oxygen compounds; compressing the syngas feed stream, a recycle syngas stream and a hydrogen recycle stream into a synthesis loop; converting nitrogen and hydrogen in the synthesis loop to ammonia; refrigerating reaction products from the conversion step to form an ammonia product stream and the recycle syngas stream; purging a portion of the recycle syngas stream to a hydrocarbon recovery unit to form the hydrogen recycle stream; and determining differential moves for manipulating feed rates for the hydrocarbon and compressed air streams by solving the objective function:

$$Min\ J=Jcv+J\lambda+Jpc+Jd$$

wherein Min J is the least square value comprising the sum of Jcv, J$\lambda$, Jpc and Jd as previously defined.

BRIEF DESCRIPTION OF THE DRAWINGS

The accompanying drawings which are incorporated in and constitute a part of the specification, illustrate a preferred embodiment of the invention and together with the general description of the invention given above and the detailed description of the preferred embodiment given below, serve to explain the principles of the invention.

FIGS. 9(a)–9(d) compare multiple graphs illustrating the molar hydrogen-to-nitrogen (H/N) ratio, feed flow, air flow and air flow constraint variables associated with active constraints as practiced by the present invention.

The above general description and the following detailed description are merely illustrative of the generic invention, and additional modes, advantages, and particulars of this invention will be readily suggested to those skilled in the art without departing from the spirit and scope of the invention.

DETAILED DESCRIPTION OF THE INVENTION

Reference will now be made in detail to the present preferred embodiments of the invention as described in the accompanying drawings.

Figure 1:
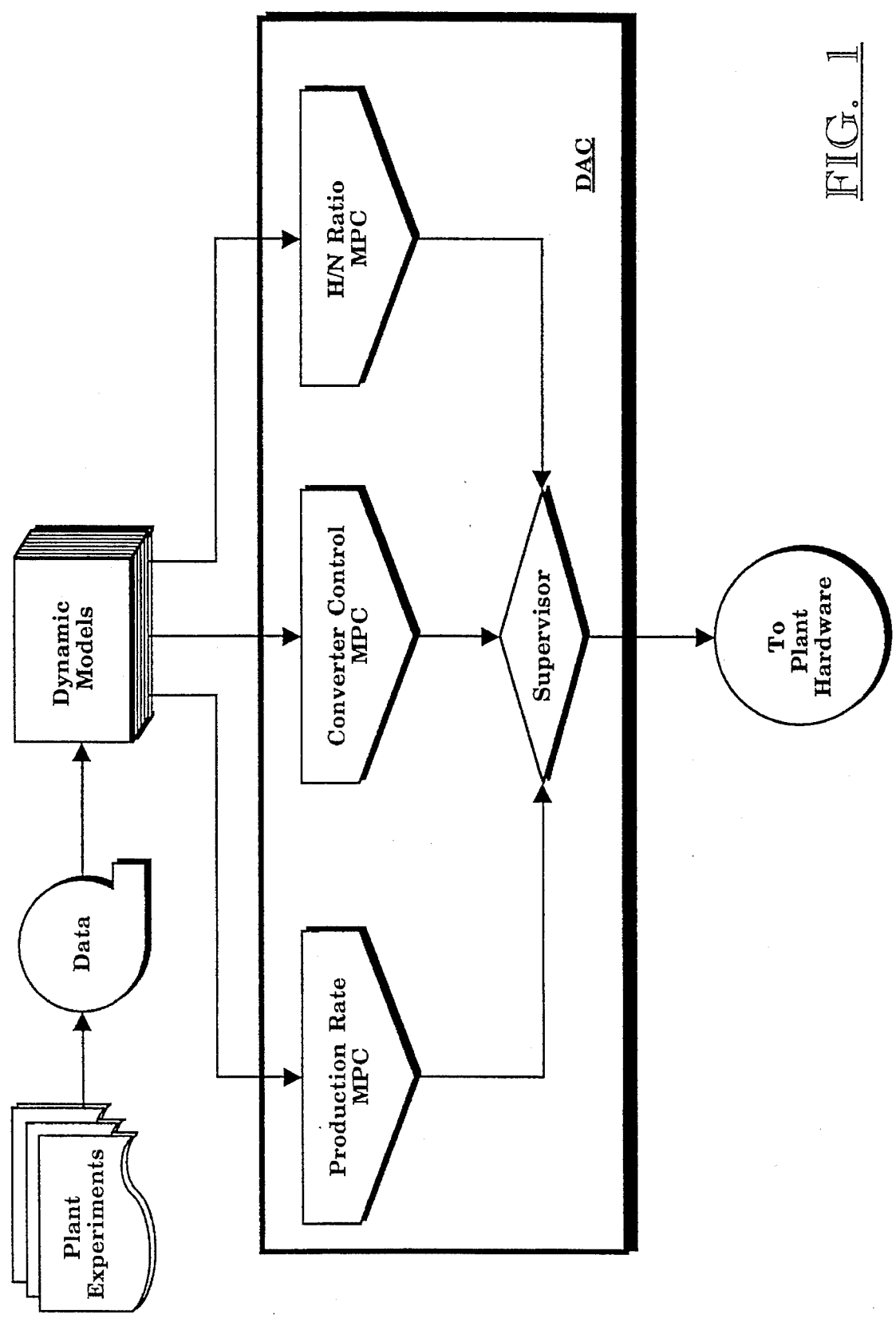
FIG. 1 is a flow diagram illustrating the general application of the present invention to a dynamic ammonia control (DAC) system.
Figure 2:
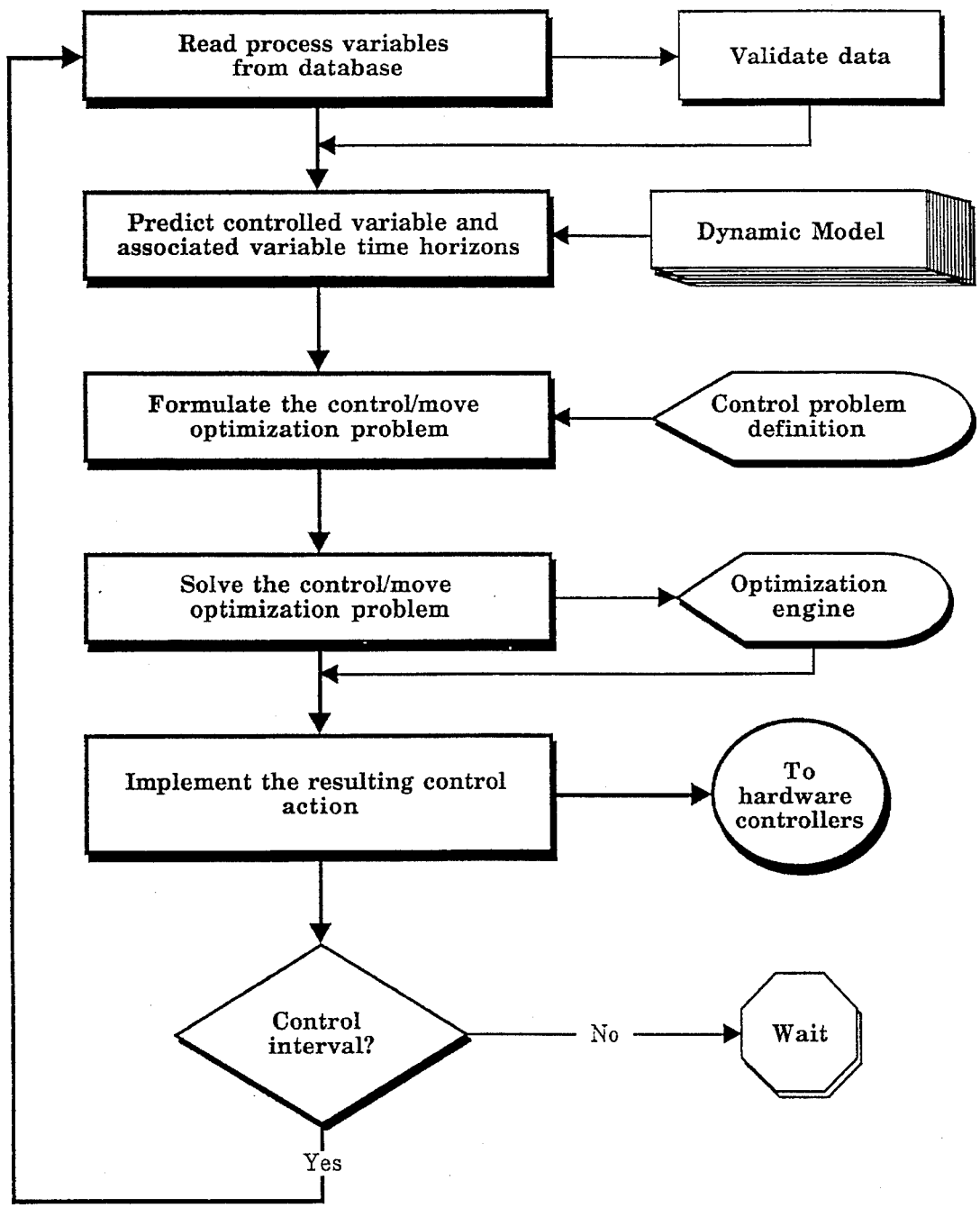
FIG. 2 is a flow diagram illustrating the model predictive control (MPC) program associated with the present invention.

FIG. 1 is a flow diagram illustrating the general application of the present invention to a dynamic ammonia control (DAC) system, an application of the present invention in association with an ammonia plant. The DAC package includes multiple advanced process control (APC) applications. Particularly, the advanced process control applications associated with the present invention are the model predictive control (MPC) technology. The model predictive control is illustrated in FIG. 2 as being applied to the ammonia production rate control (PR) subsystem, the converter control (CC) subsystem and the hydrogen-nitrogen ratio (H/N) subsystem.

The model predictive control (MPC) algorithm handles multiple inputs and/or outputs, further, the MPC can apply specific constraints to different variables. Also, the MPC performs feedforward disturbance rejection associated with operating the plant. The MPC uses a control algorithm that applies a dynamic model in the solution of a control problem. Thus, the application of the MPC of the present invention is extremely capable of controlling a plant having long settling times, dead times, complex dynamics or complex process interactions. The dynamic model used with the present invention, as illustrated in FIG. 1 is derived from data taken in actual plant experiments. The application of the present invention provides that the MPC will be a supervisory controller. Thus, the final output of the model predictive control algorithm is one or more setpoints for controlling lower level hardware in the plant. For example, the supervisor in the dynamic ammonia control (DAC) package as illustrated in FIG. 1 would manipulate the setpoint of a flow controller (FC). Also, by way of example, without limitation, the supervisor associated with the present invention can control a panel-mounted, single-loop controller unit associated with the plant.

In discussing the present invention, it is important that specific terms be adopted in connection with the model predictive control technology. The following definitions will apply:

Manipulated variables (MV) are process variables which are adjusted by MPC. The manipulated variables may be subject to upper and lower limits or "bounds."

Controlled variables (CV) are process variables which the MPC controls to a specified setpoint or "target" by adjusting the manipulated variables.

Associated variables (AV) are process variables which are not controlled, but must be kept within a predetermined limit or "bounds." Associated variables are also known in the literature as constraint variables, and are not to be confused with the permanent constraints defined below.

Disturbance variables (DV) are measured process variables which affect the controlled variables or the manipulated variables. The disturbance variables are not manipulated by the MPC. The disturbance variables are used to provide feedforward rejection for both the controlled variables and the associated variables. The disturbance variables are generally designated as CV-DV (controlled variable-disturbance variable) or AV-DV (associated variable-disturbance variable) to distinguish them from each other.

Permanent constraints (PC) are selected manipulated variable targets that have a desired value. In the present invention, the PC's are preferably set artificially high for the controller to attain to the extent possible.

The above definitions will be utilized throughout the discussion of the present invention.

FIG. 2 is a flow diagram illustrating a simplistic outline of one example of the MPC program as adopted for use in FIG. 1 with the production rate controller, the converter controller and the N/H ratio controller associated with the dynamic ammonia control package. Simply stated the MPC reads the process variables from the database. The process variables are validated. Using information from the dynamic model, controlled variables are predicted. The predicted control variables are associated with variable time horizons. The control problem definition is used so that the control/move optimization problem can be formulated. Thereafter the control/move optimization problem is solved. The presently preferred embodiment of the MPC solves the control formulation problem using a commercially available non-linear optimization engine. The non-linear optimization engine preferably used in the present embodiment is the so-called GRG2 software from Optimal Methods, Inc. by L. Lasdon at the University of Texas-Austin and A. Warren at Cleveland State University, although other commercially available optimization engines could also be suitably employed. The GRG2 software uses a feasible-path, successive linear programming technique. The linear programming technique used by the GRG2 software is known as generalized reduced gradients. After the optimization problem is solved, the resulting control action is implemented. Thus, hardware controllers associated with the plant are adjusted or changed based upon the information received from the solution of the optimization problem. A specific control interval is set such that the MPC will start over at any predetermined interval.

Figure 3:
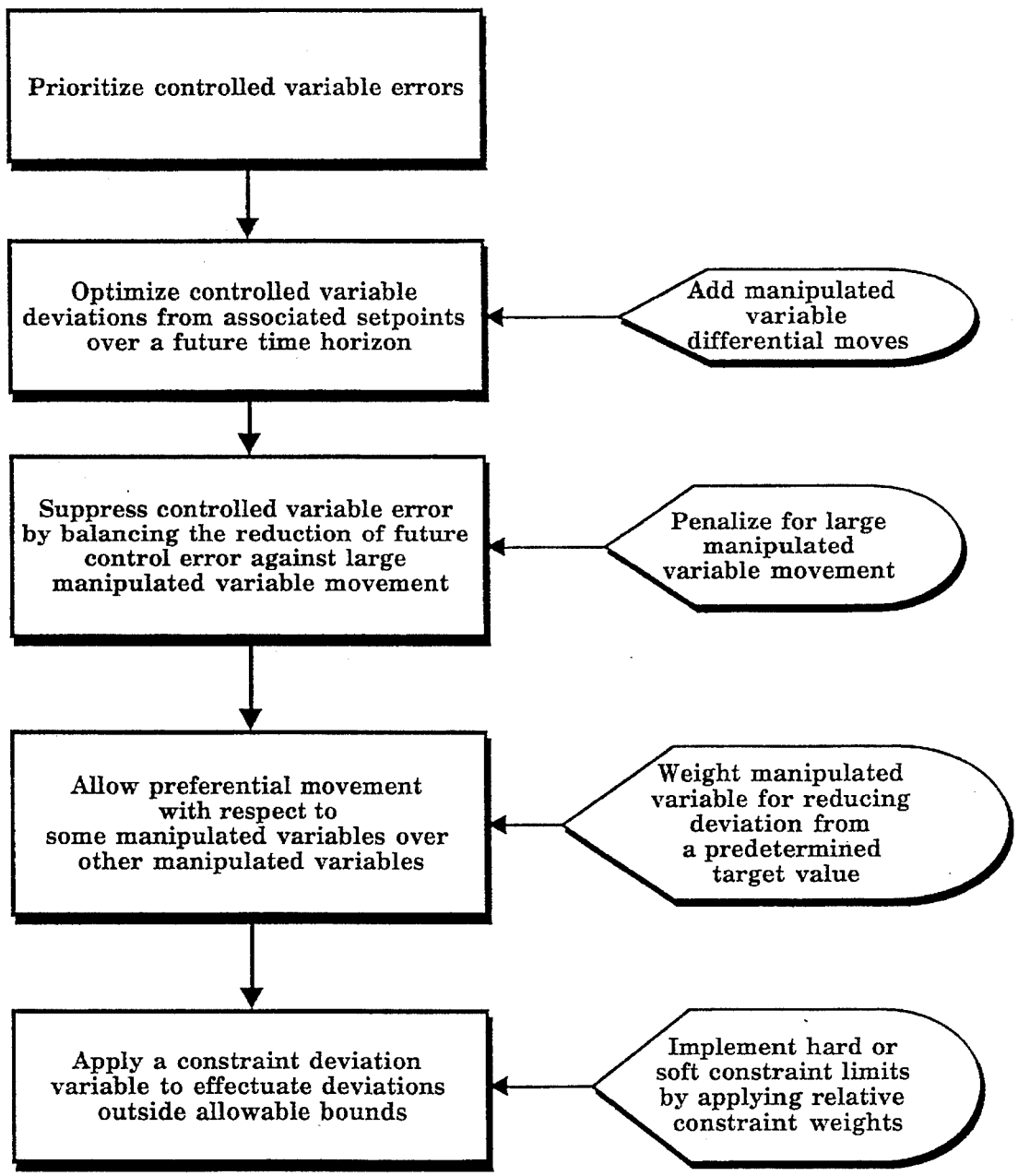
FIG. 3 is a flow diagram that illustrates the multivariable optimal control objective function associated with the present invention.

The MPC of the present invention can be described in terms of objective function. FIG. 3 is a flow diagram that illustrates the objective function associated with the model predictive control of the present invention. The controlled variable errors are prioritized. The controlled variable deviations from associated setpoints are optimized over a future time horizon. The manipulated variable differential moves are used in the optimization. Thereafter, manipulated variable moves are suppressed. The suppression is used for balancing the reduction of future control error against large manipulated variable movement. Generally, the suppression provides that large manipulated variable movement is penalized. Depending on the situation, preferential movement is allowed with respect to some manipulated variables over other manipulated variables. The preferential movement is accomplished by weighing manipulated variables for reducing deviation from a predetermined target value. Lastly, the constraint deviation variable is applied to allow deviations outside set bounds. The application of the deviation variable is achieved by implementing "hard" or "soft" weights by applying relative constraints weights.

The MPC algorithm as illustrated in FIG. 3 can be described in equation form as follows:

$$Min\ J = Jcv + J\lambda + Jpc + Jd$$

wherein Min J, Jcv, J$\lambda$, Jpc and Jd are as previously defined. The first term (Jcv) of the equation describing the objective function is used to minimize the sum of the squares of the deviations in the control variables. The sum of the squares of the deviations is determined based upon the setpoint of the controlled variables over a projected future time horizon. The independent variables for optimizing the sum of the squares of the deviations are the differential moves of the manipulated variables, x. The CVwate factors are used in a multiple controlled variable problem. The CVwate factors are used to weigh controlled variable errors relative to each other.

The second term (J$\lambda$) of the equation for the objective function of the MPC of the present invention is used to penalize excessively large movement of the manipulated variables. The move suppression factors $\lambda$ are used for controller tuning to balance the reduction of future control error against large manipulated variable movement.

The third term (Jpc) of the equation for the objective function of the MPC represents the use of permanent constraint targets for selected manipulated variables. When using permanent constraint targets, the optimization is penalized for any deviation of those manipulated variables from their individual permanent constraint targets. This allows for preferential treatment in moving some manipulated variables over other manipulated variables. Generally, a manipulated variable with a permanent constraint will stay at its target value until all other degrees of freedom are used. When setting at least one permanent constraint target artificially high in accordance with the present invention, the third term will never be zero and the MPC will constantly attempt to attain the impossible target. In this manner the establishment of the high PC target for maximizing process capacity is effected by, for example, setting the desired feed rate target beyond maximum capacity. The PCwate factor specifies how tightly the optimization must enforce the permanent constraint. It should be noted that a heavily weighted permanent constraint will stay as close as possible to its target until considerable control error occurs. Thus, selecting a PCwate factor usually requires a compromise between holding the permanent constraint as closely as possible its target, on the one hand, and not allowing the control variable to move away from its target, on the other.

The fourth term (Jd) of the objective function of the MPC equation uses a constraint deviation variable (d). The constraint deviation variable is used to handle constraint function deviations outside normal allowable bounds.

The objective function serves several purposes. First, the objective function allows the use of the constraint deviation variables as a degree of freedom to ensure the feasibility of the solution with respect to highly constrained problems. At the same time, the objective function will penalize for the use of non-zero constraint deviation variables. Lastly, the objective function allows the use of relative constraint weights (AVcost) to implement the concept of "hard" and "soft" constraints.

Figure 4:
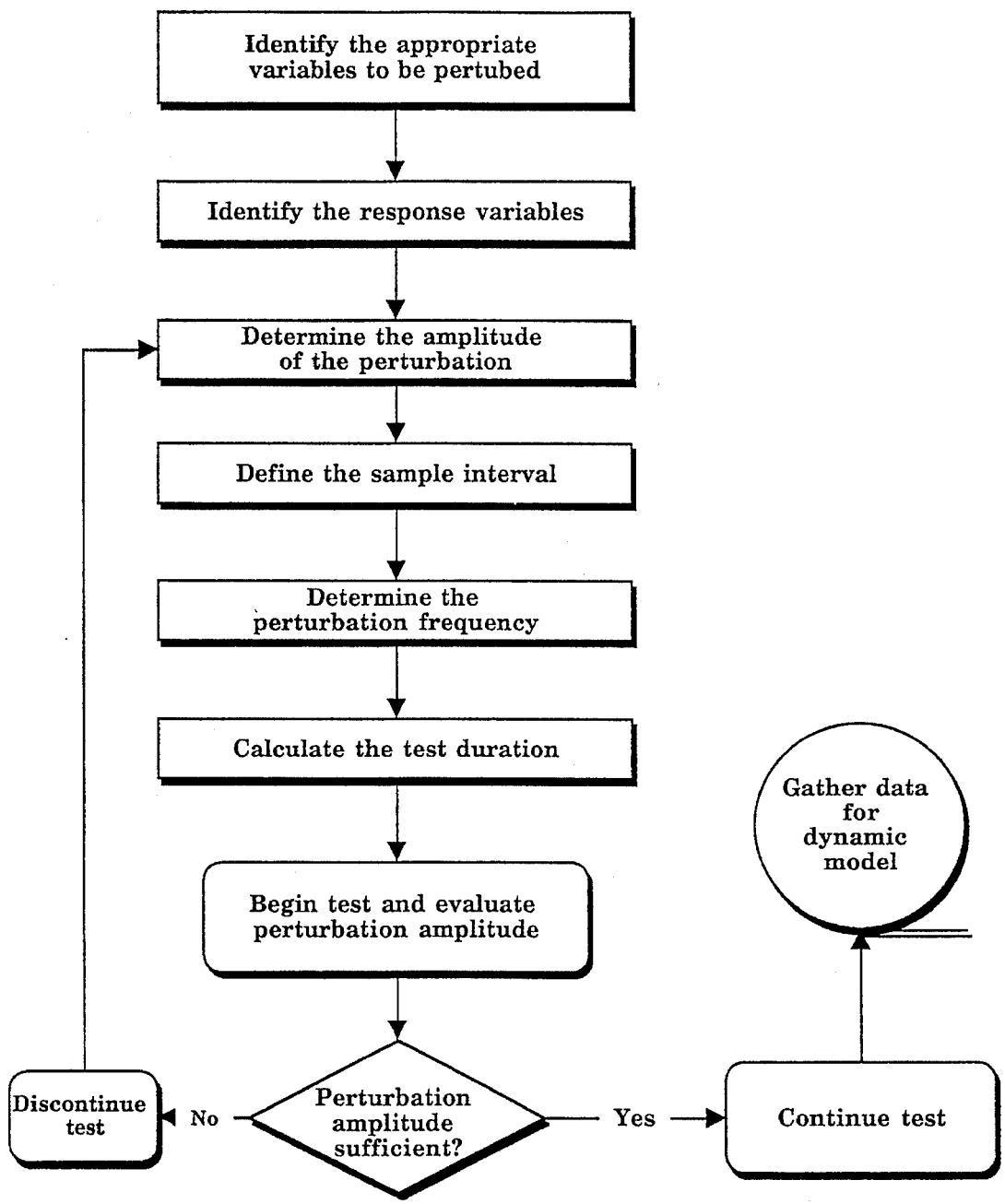
FIG. 4 is a flow diagram illustrating one example of a procedure for plant testing using the pseudo-random binary noise test to develop data for a dynamic model of the plant.
Figure 5:
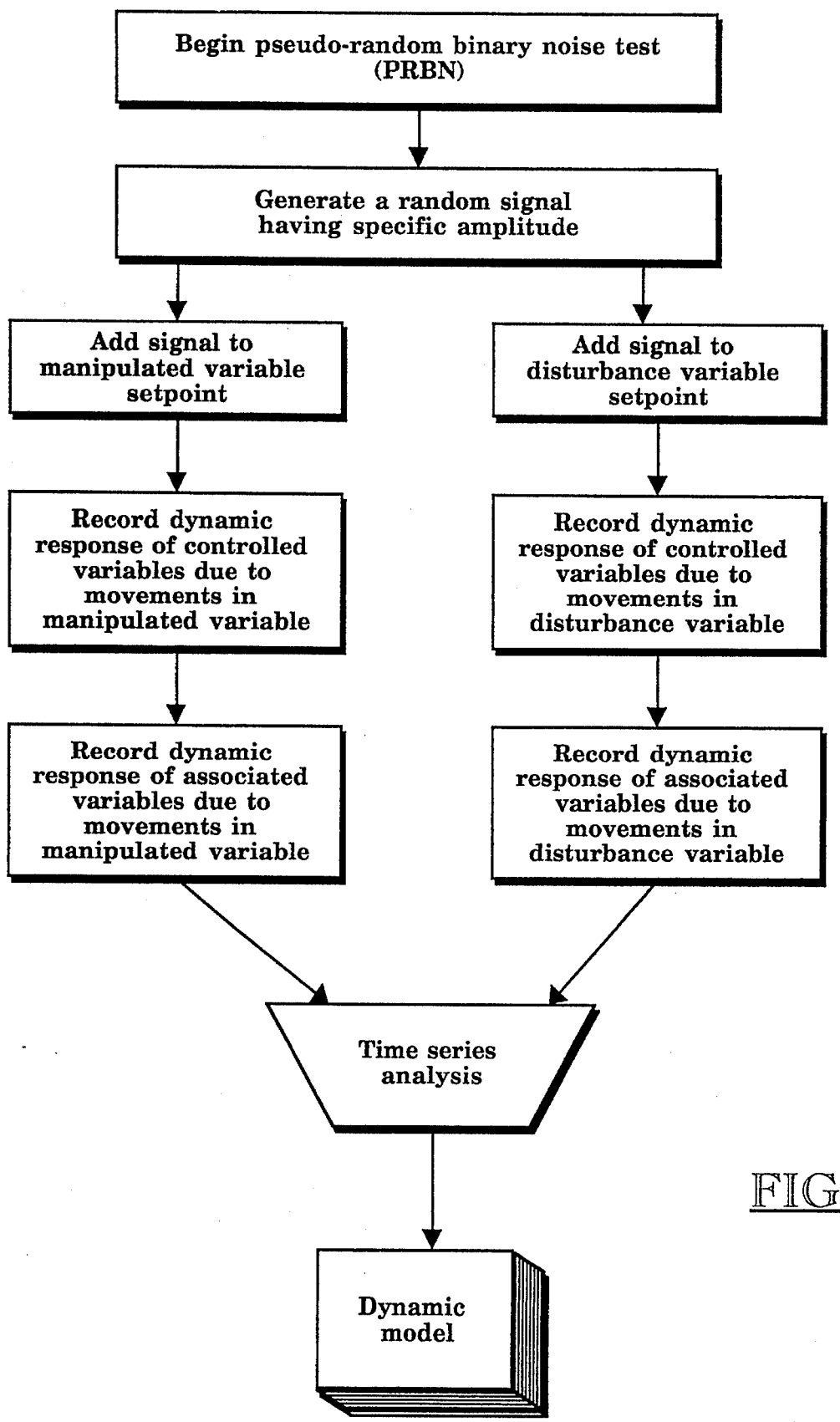
FIG. 5 is a flow diagram illustrating, in further detail, aspects of one embodiment of the pseudo-random binary noise test used in the procedure illustrated in FIG. 4.

FIG. 4 illustrates the preferred embodiment of plant testing for the present invention. It can be appreciated by those skilled in the art that many and numerous testing procedures are readily available. The presently preferred embodiment of plant testing is provided without limiting the scope of the invention. As previously stated, the application of the MPC requires the use of a dynamic model associated with the process to be controlled. The dynamic model used in the present embodiment of the invention takes the form of a vector of step response coefficients. The vector of step response coefficients is generally obtained by performing plant tests on the process. For example, one such test commonly employed in the art is known as the pseudo-random binary noise test (PRBN). Generally, the PRBN adds a randomly generated signal of specific size or amplitude to the manipulated variable setpoint, and to the disturbance variable, if possible. The dynamic responses due to the movements in the manipulated variable are recorded. Based upon the dynamic responses, the dynamic model is generated. FIGS. 4 and 5 illustrate the plant testing using the pseudo-random binary noise test (PRBN).

FIG. 5 is a flow diagram illustrating in further detail, aspects of the plant testing using PRBN. Examples of typical manipulated variables to be perturbed in an ammonia plant are the feed gas to the primary reformer, potential hydrogen target and the air flow to the secondary reformer. These variables are associated with the H/N ratio controller illustrated in FIG. 1. Also, for the converter controller illustrated in FIG. 1, manipulated variables to be perturbed might include the coldshot setpoint and the intercooler inlet setpoint as well as quench flows and bypass setpoints depending on the type of ammonia converter. If possible, disturbance variables should be perturbed as well. For the H/N ratio controller, disturbance variables to be perturbed might include, for example, hydrogen recovery unit-low pressure (HRU LP) product hydrogen fraction and hydrogen recovery unit-high pressure (HRU HP) product hydrogen fraction. For the converter controller, the H/N ratio and the primary feed gas rate are the disturbance variables, which can be perturbed directly.

The response variables are the variables whose responses, due to the perturbation are collected and analyzed. As examples of response variables in the H/N ratio controller, the controlled variable is the H/N ratio and the associated variable is the speed of the compressor. The disturbance variable for the speed of the compressor is normally the ambient air temperature. Similarly for the converter controller response variables, the controlled variables might, for example, be the bed inlet temperatures and the associated variable might be the converter effluent temperature, again depending on the type of ammonia converter.

The determination of the perturbation amplitude size is important so that the process responses can be readily detected. It has been found that there is advantage to having the first and last PRBN moves with an amplitude size smaller than the intermediate PRBN moves, for example one-half the intermediate amplitude. The sample interval is typically defined in seconds for both H/N ratio and converter control applications. The sample interval can be limited, for example, by the mass spectrometer analysis cycle time, typically two minutes. Also, the sample interval is generally, at a minimum, the same period of time as the execution length of the MPC program. The perturbation frequency is usually expressed in samples per second, for example, typically ten to fourteen for the H/N ratio controller, and typically eight to twelve for the converter controller. It is important to note that the perturbation frequency can not be less than the process dead times. The duration of the test depends on the PRBN register length, typically a minimum of three and a maximum of eleven.

Figure 6:
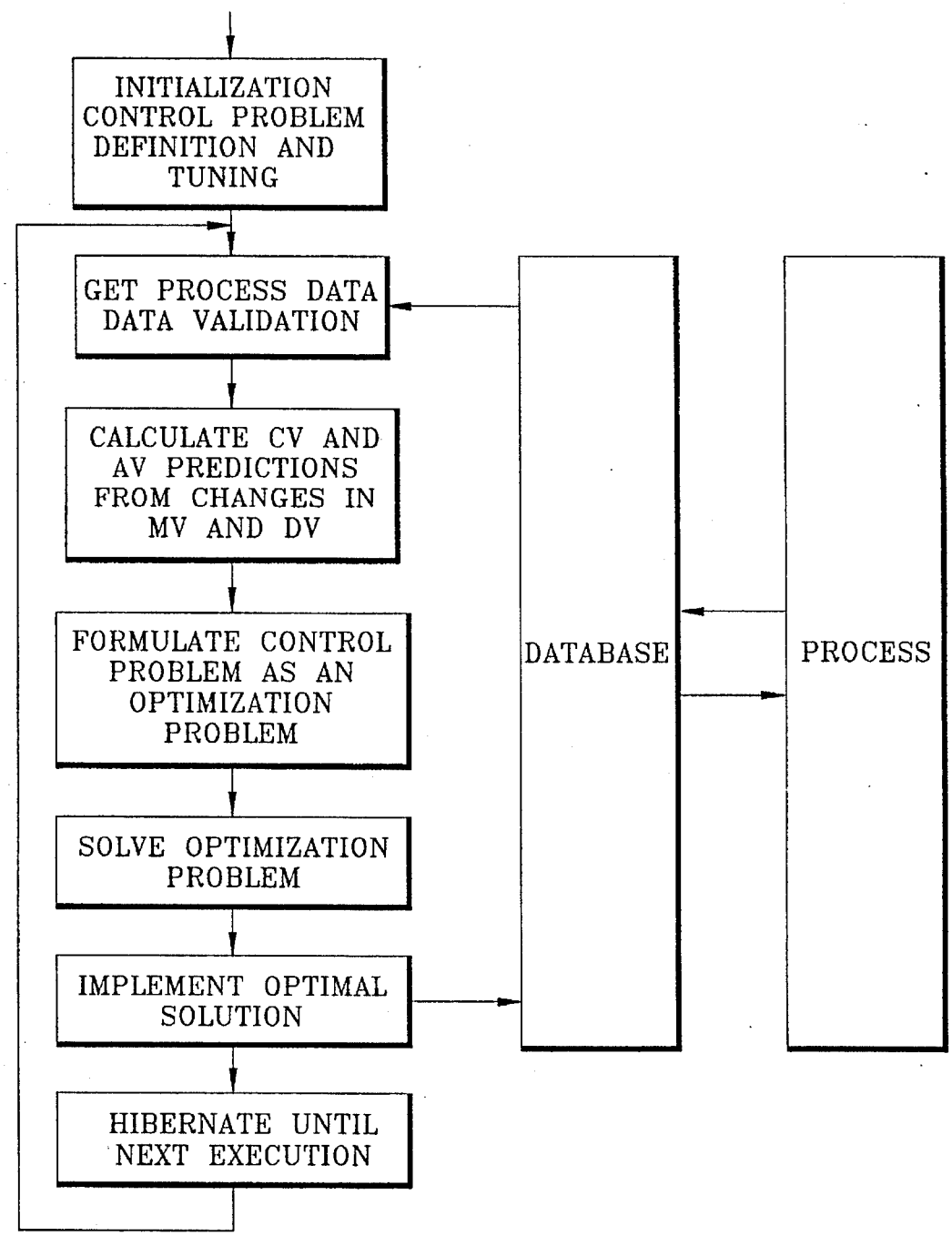
FIG. 6 is a flow diagram illustrating the functional logic associated with the model predictive control of the present invention.

FIG. 6 illustrates a functional logic diagram for the MPC of the present invention. The initialization control problem and definition and tuning are first addressed. The control problem in tuning information is provided in association with the database information. From the combined information, a controlled variable calculation and associated variable predictions are made. The calculation of the controlled variable and the associated variable predictions are based upon changes in the manipulated variable and the disturbance variable. The control problem is formulated as an optimization problem. The optimization problem is solved. The optimal solution is implemented. The data from the optimal solution is inputted, as an update, to the database. The next execution is initiated after a predetermined hibernation period. When the data is received from the database, the new input information is included.

Figure 7:
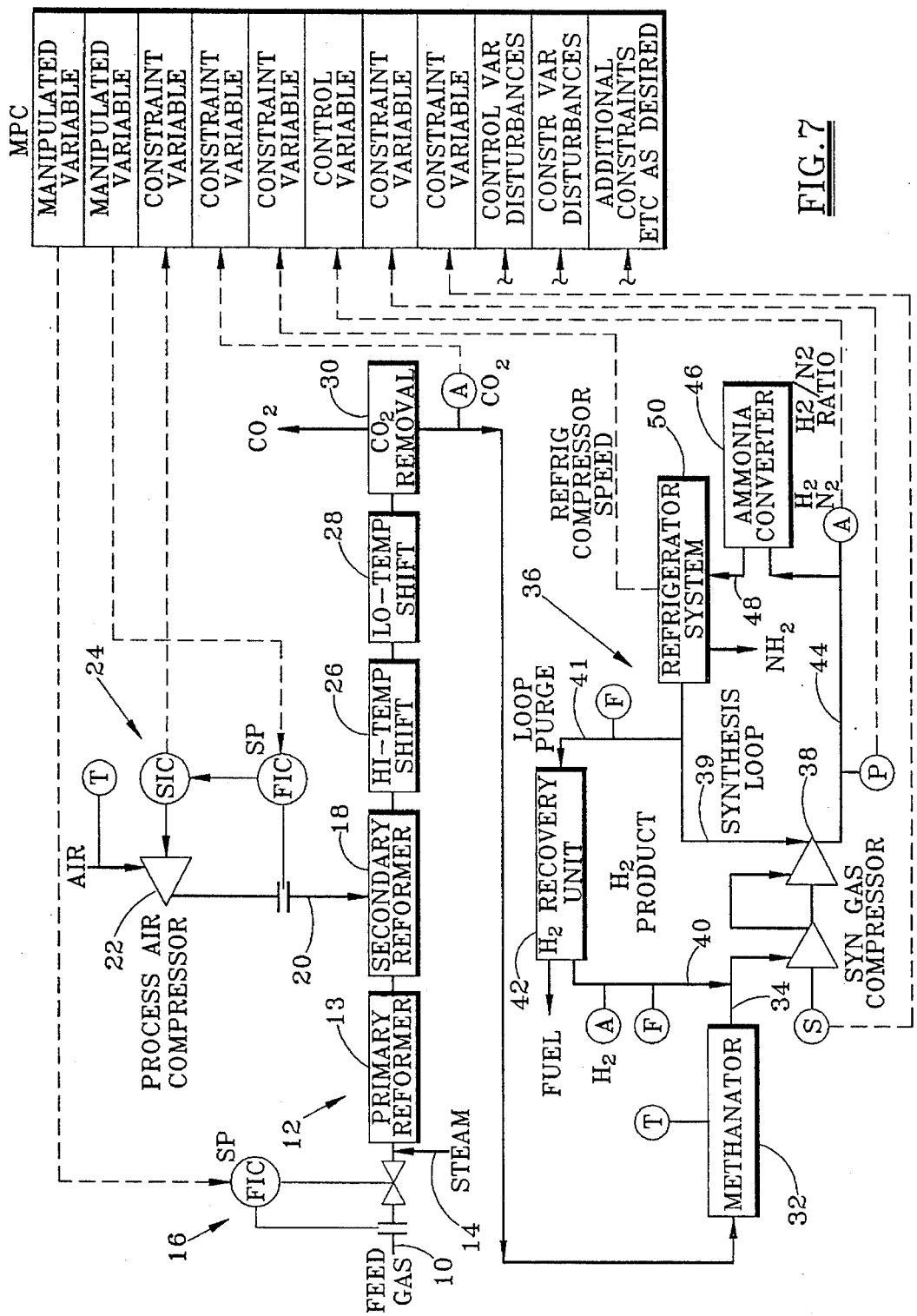
FIG. 7 is a schematic flow diagram illustrating an ammonia production rate controller for use in an ammonia plant as practiced by the present invention.

FIG. 7 illustrates a schematic flow diagram of an ammonia production rate control apparatus used in a typical ammonia plant. A hydrocarbon stream such as methane or another hydrocarbon is introduced through line 10 for feed to a reforming stage 12 with steam from a steam feed line 14. A flow control apparatus 16 as is well known in the art controls the flowrate of the hydrocarbon feed. Flowrate of the hydrocarbon stream 10 comprises one of the two manipulated variables inputted into the MPC.

In the reforming stage 12, hydrogen for ammonia synthesis is produced as the product of hydrocarbon oxidation in the presence of air introduced through line 20. The incoming air also supplies nitrogen required for ammonia synthesis. The air stream 20 is compressed by an air compressor 22. Thus, it can be seen that air flowrate is the second of the two manipulated variables in the process to be controlled by the MPC affecting both the quantity of hydrogen produced in the reforming stage 12 and the H/N ratio of an ammonia syngas. Air flowrate is conventionally adjusted by changing the speed of the compressor 22 using a speed controller 24. Since the air compressor output is typically a quantity fixed by plant design, the speed limitation of the compressor 22 is a system constraint or associated variable in the MPC.

The typical reforming stage 12 includes in series primary reformer 13, secondary reformer 18, high temperature shift reactor 26 and low temperature shift reactor 28, but other configurations of the reforming stage 12 are sometimes used and can also be operated according to the principles of the present invention. Effluent from the primary reformer 13 undergoes additional oxidation in the secondary reformer 18 to which the air stream 20 is also supplied. Raw ammonia syngas effluent from the secondary reformer 18 is directed to the shift reactors 26, 28 wherein carbon monoxide produced by reforming is converted in the presence of steam to carbon dioxide and additional hydrogen. Next, a $CO_2$-rich effluent thus produced is treated, such as, for example, in a $CO_2$ removal apparatus 30 and a methanation reactor 32, and/or cryogenically (not shown), to reduce concentration of $CO_2$ and other oxygen compounds to acceptable levels and produce a purified ammonia syngas stream 34. Oxygen compounds in the syngas can act as a catalyst poison, thus, syngas $CO_2$ concentration comprises a second constraint variable in the MPC.

The purified syngas stream 34 forms makeup syngas for feed to an ammonia synthesis loop 36. The makeup syngas is compressed to the pressure of the synthesis loop 36 in a multi-stage compressor 38. Conventionally, makeup syngas is combined with a recycle syngas stream 39 and a hydrogen stream 40 recovered from a synthesis loop purge stream 41 in a hydrocarbon recovery unit (HRU) 42 to form a compressed syngas stream 44 for feed to an ammonia converter 46. The compressed syngas stream 44 has a desired ratio of $H_2$ to $N_2$ which thus comprises the control variable of the MPC. Ammonia is recovered from an effluent stream 48 from the ammonia converter 46 in an ammonia recovery unit 50 conventionally employing a liquid refrigerant.

Additional process constraint variables in the MPC include the speed of the syngas compressor 38, the speed of a refrigeration compressor (not shown) and the pressure of the ammonia converter 46. The MPC also has inputs for one or more constraint/control variable disturbances including, for example, ambient air temperature, $H_2$ flow produced by the HRU 42, inerts level in the synthesis loop purge stream 40, and the ratio of hot to cold ammonia recovered in the ammonia recovery unit 50.

As can be appreciated by those skilled in the art, the ammonia production control application of the present invention, as illustrated in FIG. 7, is only one of many control applications available for the present invention.

Figure 8:
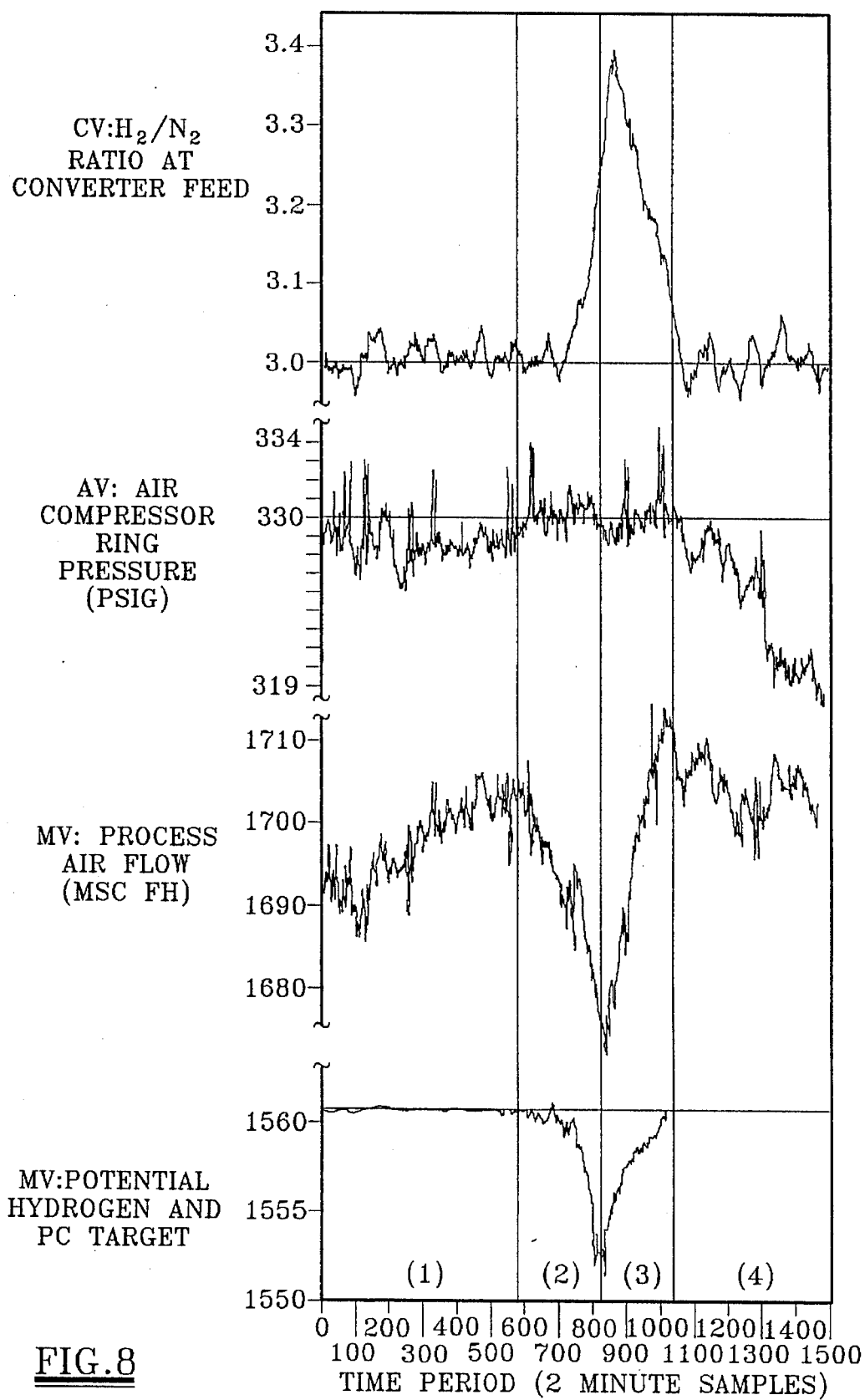
FIG. 8 is a graph illustrating the performance of the H/N model predictive controller of the present invention with constraint control.
Figure 11:
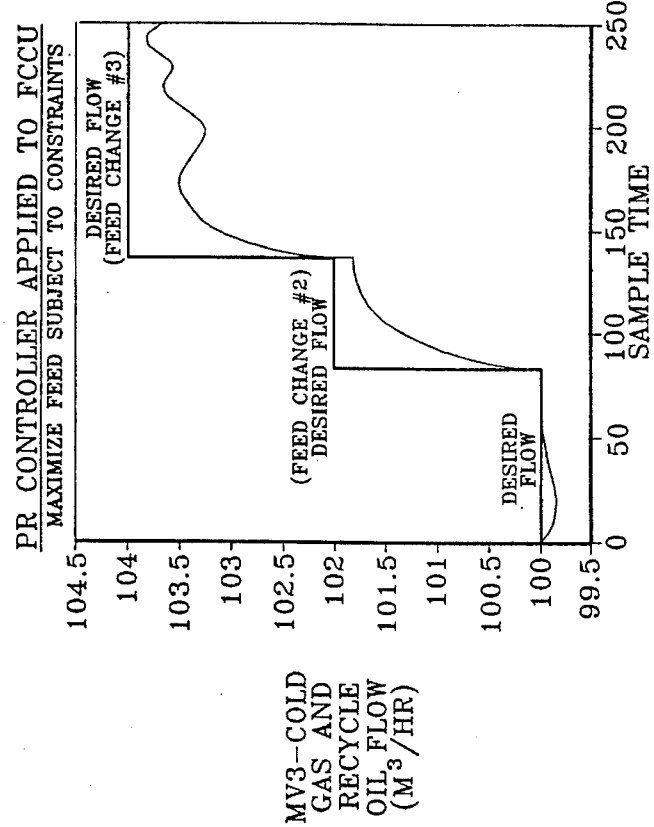
FIG. 11 is a graph illustrating the cold gas and recycle oil flow versus the sample time for the production rate controller as applied to an FCCU.
Figure 10:
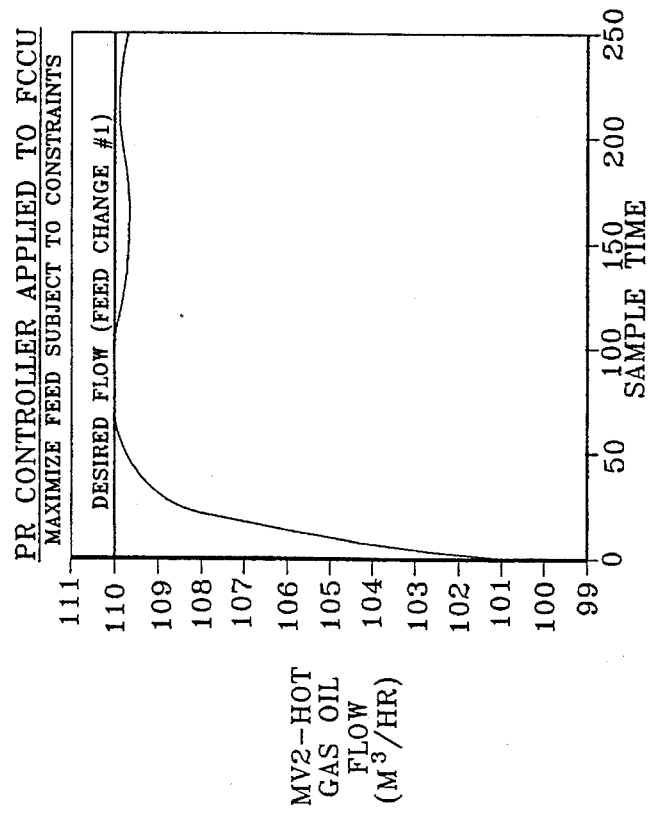
FIG. 10 is a graph illustrating the hot gas oil flow rate versus the sample time for the production rate controller of the present invention as applied to a fluidized catalytic cracking unit (FCCU).
Figure 12:
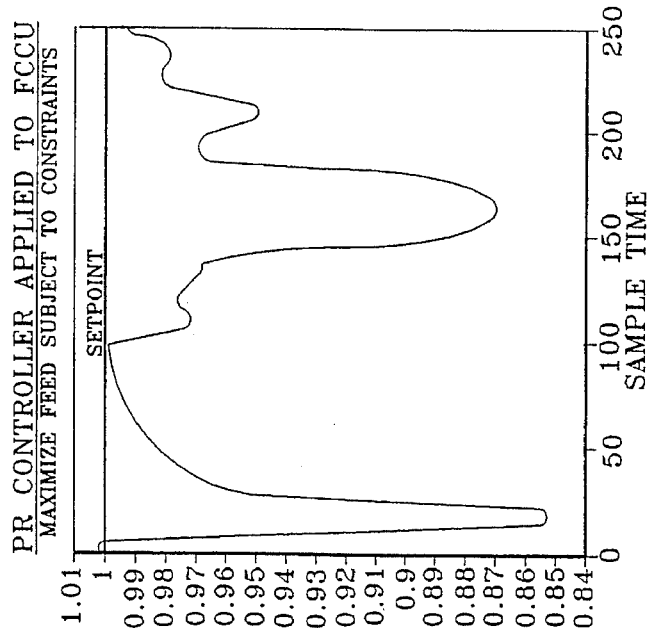
FIG. 12 is a graph illustrating the flue gas oxygen concentration versus the sample time for a production rate controller of the present invention as applied to an FCCU.
Figure 13:
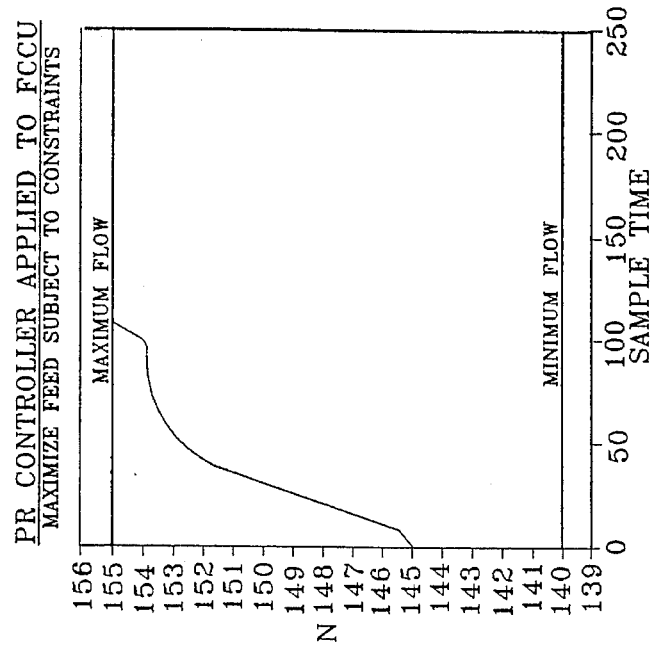
FIG. 13 is a graph illustrating the combustion air flow versus the sample time for the production rate controller of the present as applied to an FCCU.
Figures 14, 15:
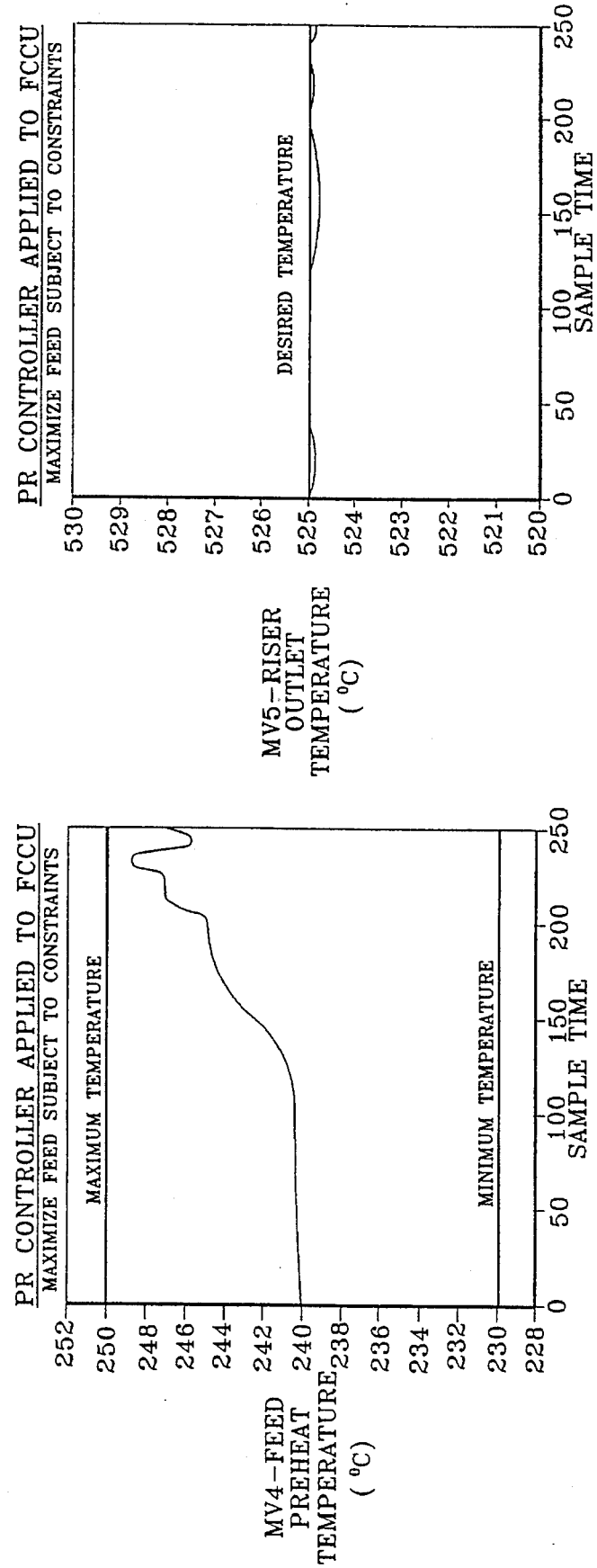
FIG. 14 is a graph illustrating the feed preheat temperature versus the sample time for a production rate controller of the present invention as applied to an FCCU.
FIG. 15 is a graph illustrating the riser outlet temperature versus the sample time associated with a production rate controller of the present invention as applied to an FCCU.
Figures 16, 17:
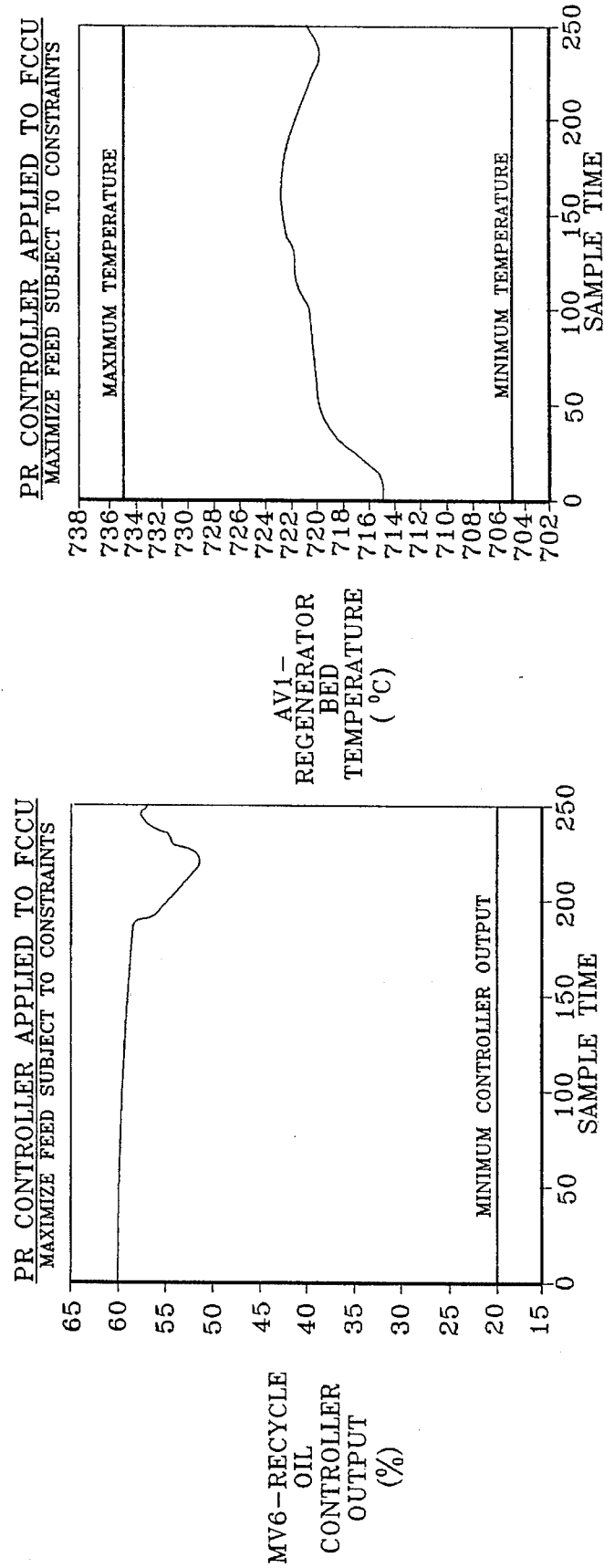
FIG. 16 is a graph illustrating the recycle oil controller output versus the sample time for a production rate controller of the present invention as applied to an FCCU.
FIG. 17 is a graph illustrating the regeneration bed temperature versus the sample time associated with a production rate controller of the present invention as applied to an FCCU.
Figure 19:
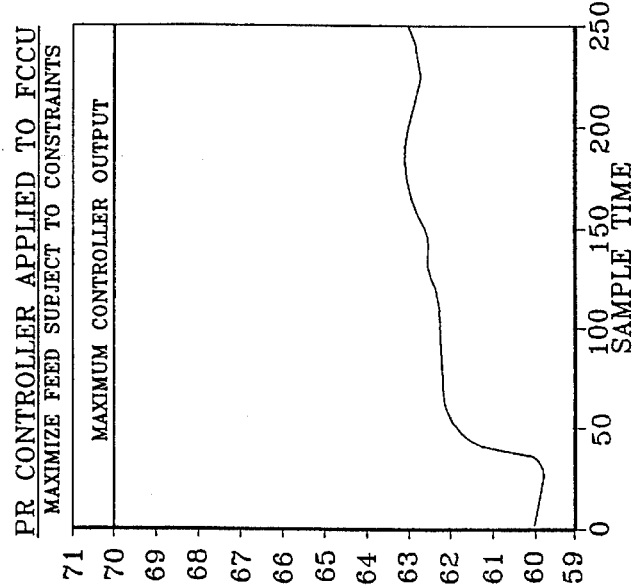
FIG. 19 is a graph illustrating the waste gas compressor suction pressure controller output versus the sample time associated with a production rate controller of the present invention as applied to an FCCU.
Figure 18:
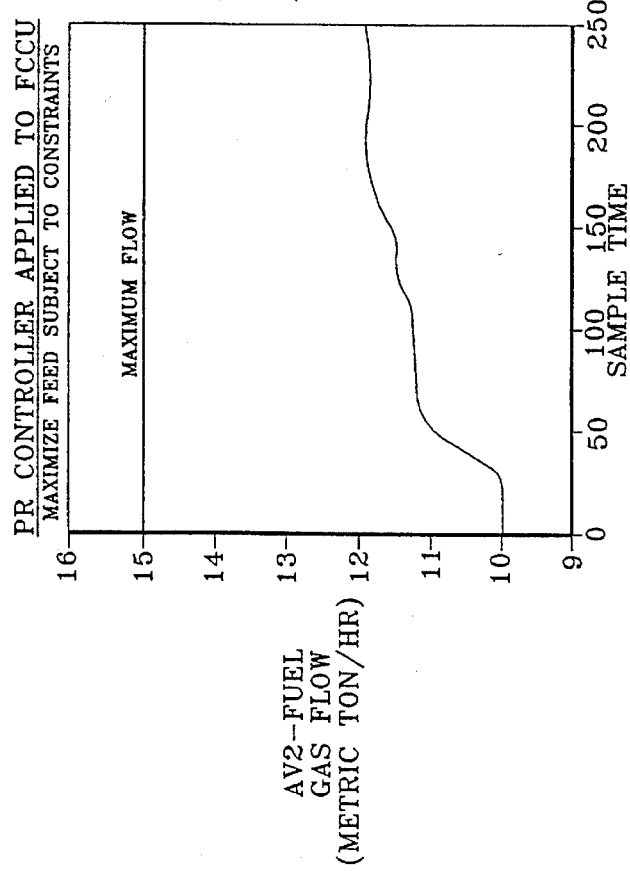
FIG. 18 is a graph illustrating the fuel gas flow versus the sample time for a production rate controller of the present invention as applied to an FCCU.
Figure 21:
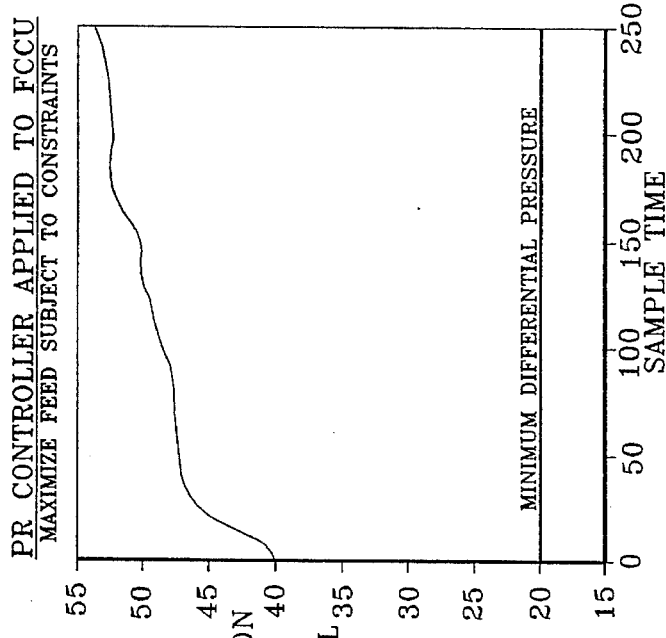
FIG. 21 is a graph illustrating the regeneration catalyst slide valve (SV) differential pressure versus the sample time associated with a production rate controller of the present invention as applied to an FCCU.
Figure 20:
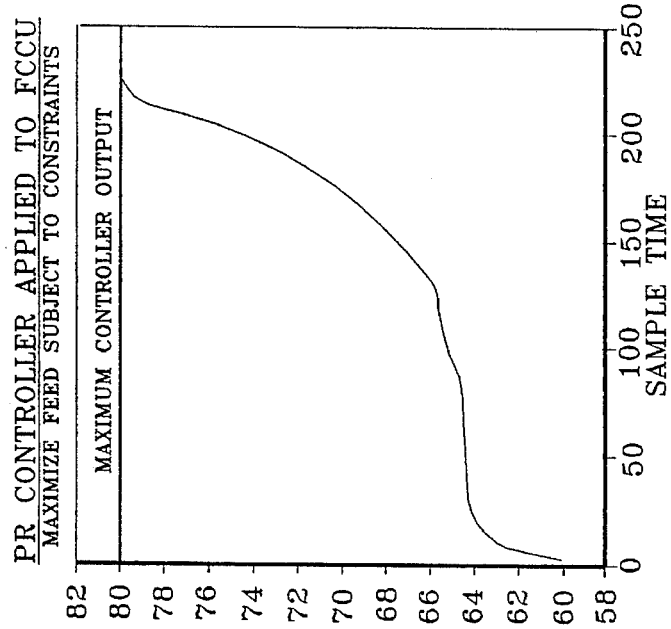
FIG. 20 is a graph illustrating the riser outlet temperature controller output versus the sample time for a production rate controller of the present invention as applied to an FCCU.
Figure 22:
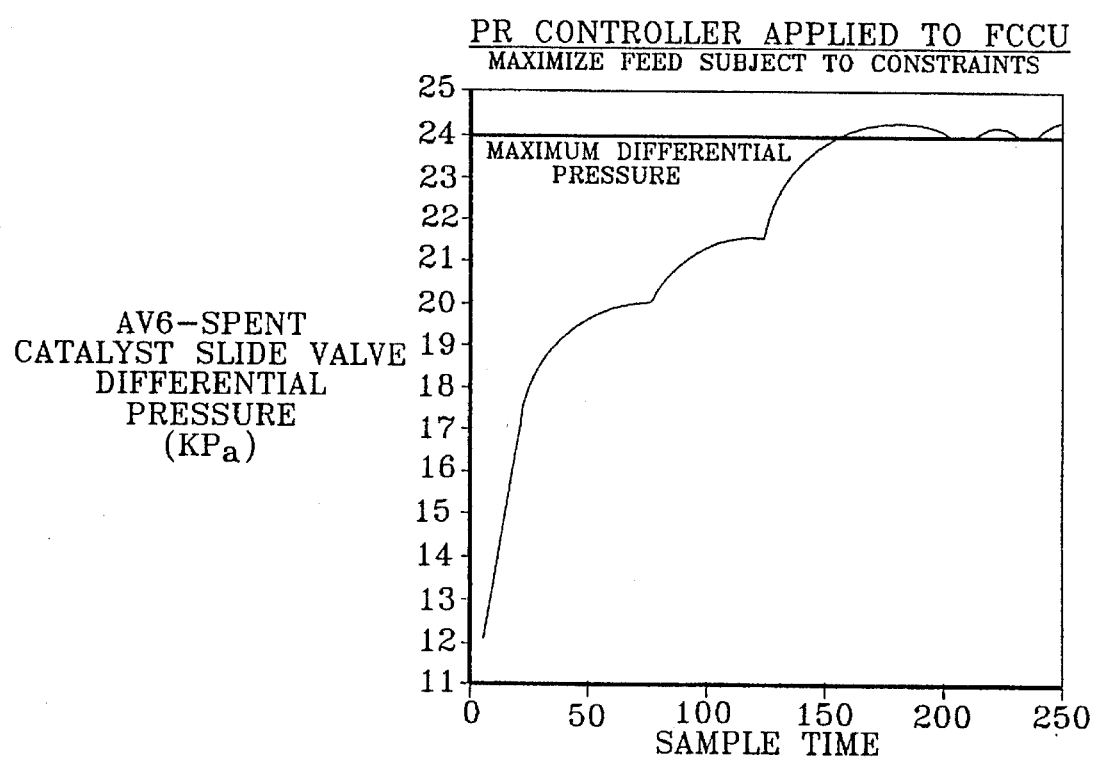
FIG. 22 is a graph illustrating the spent catalyst slide valve (SV) differential pressure versus the sample time associated with a production rate controller of the present invention as applied to an FCCU.

FIG. 8 is a graph illustrating the performance of H/N model predictive control with respect to constraint control. FIG. 8 is actual data of H/N control using the MPC of the present invention. In FIG. 8, the air compressor turbine ring pressure was the constraint variable and the ambient air temperature was the disturbance variable. The performance of the MPC controller during a forty eight hour period of operation is illustrated. The corresponding sequence of events are readily apparent. In section 1, the control variable H/N ratio is held at its setpoint while holding the turbine ring pressure slightly below the constraint of 330 psig. In section 2, when the ring pressure violation was predicted due to a rapid increase in ambient air temperature (not shown), the controller reduced the air flow to maintain the ring pressure at its constraint. The H/N ratio was allowed to drift from the setpoint. The H/N ratio drifting away from its setpoint caused a reduction in feed gas. The reduction in the feed gas ensured that the ratio did not drift too far.

The degree of excursion of the H/N ratio is a subjective tuning compromise. The compromise is based on how much feed gas is reduced trying to maintain the setpoint. In the illustrated example, it was initially decided to hold the feed as high as possible, but it was subsequently decided to manipulate the feed more aggressively to better control the ratio. This example is a simple MPC tuning change. In section 3 of FIG. 8, the ambient air temperature dropped at the end of the day (not shown). After the ambient air temperature dropped, the controller increased the air flow, restoring the H/N ratio to its target. Also, the feed gas was restored to its original value. It is important to note that the ring pressure was maintained at its constraint during this period of time. In section 4 of FIG. 8, the ring pressure is no longer an active constraint, and both the H/N ratio and the feed gas rate are permitted to return to their targets.

The example of FIG. 8 illustrates the capability of the MPC as an effective constraint controller. The controller reduced air flow to prevent a predicted violation of the ring pressure constraint as ambient air temperature rose. It later increased air flow as ambient air temperature cooled off. In the interim, the MPC minimized both the excursion of the controlled variable, H/N, from its target and the extent to which the feed was cut to achieve that target. The actual balance between these opposing issues is a MPC tuning perimeter.

In FIGS. 9(a)–(d), there is shown similar data for the performance of H/N MPC to that of FIG. 8, but in addition to the H/N ratio and target (FIG. 9(a)), potential hydrogen (PH) and the PH permanent constraint (PC) target (FIG. 9(b)), air flow (FIG. 9(c)) and air compressor turbine ring pressure and limit (FIG. 9(d)), there is also shown the feed gas flow rate (FIG. 9(b)) and the ambient air temperature (FIG. 9(d)). For the first nine hours, the H/N ratio set point in the simulation is 2.98, and then 3.0 for the remainder of the simulation periods (see FIG. 9(a)).

For the first 6–7 hours of the simulation, the air temperature stays relatively low. While the ambient air temperature is low, the upper pressure limit on the air compressor is not an active constraint and the PH flow is controlled toward the PH target to maximize ammonia production, i.e., the PH target is the active constraint. When the air temperature begins to rise to 87° F., the ring pressure increases toward its upper limit. In response, the MPC reduces the air flow and feed gas flow rates while maintaining the H/N ratio close to the H/N target. When the air temperature fluctuates between 80° F. and 87° F., the MPC adjusts the air and feed gas flows accordingly to maintain the compressor ring pressure below its constraint limit. At the end of the simulation, the air flow and feed gas flow are increased as the constraint to maximize production becomes more active and the air compressor ring pressure becomes an inactive constraint.

Attached as Appendix I is a print-out of databases and related files used with the MPC for a typical ammonia plant simulation according to the principles of the present invention.

In FIGS. 10–22, the MPC controller was applied to a fluidized catalytic cracking unit (FCCU) simulation based on the modeling data of Grosdidier et al. The manipulated, control and associated variables in the FCCU process are tabulated in Tables 1 and 2. The control objective was similar to that in the prior example, that is, to maximize feed to the unit while controlling a process variable at its setpoint and feed to the unit while controlling a process variable at its setpoint and simultaneously honoring a number of process constraints. With respect to FIGS. 10–22, the control objective was to maximize feed gas (MV2 and MV3) while maintaining the oxygen concentration in the flue gas at its setpoint and the riser outlet temperature at its desired target. The controller must also observe all the limits specified for the manipulated variables and the associated variables.

TABLE 1:

FCCU MANIPULATED VARIABLES

| Description | Tagname Limit Values | Control Objective |
|---|---|---|
| Combustion airflow | MV1 140–155 T/H | |
| Hot gas oil flow | MV2 90–110 M³/H | Desired target |
| Combined cold gas and recycle oils | MV3 90–110 M³/H | Desired target |
| Feed preheat temperature | MV4 230–250° C. | |
| Riser outlet temperature | MV5 515–535° C. | Desired target |
| Recycle oil flow controller output | MV6 20–80% | |

TABLE 2:

FCCU CONTROL AND ASSOCIATED VARIABLES

| Description | Tagname Limit Values | Control Objective |
|---|---|---|
| Flue gas O₂ concentration | CV1 1.0% | Setpoint |
| Regenerator bed temperature | AV1 705–735° C. | Zone limits |
| Fuel gas flow | AV2 15 T/H | Maximum limit |
| Wet gas compressor suction pressure controller output | AV3 70% | Maximum limit |
| Riser outlet temperature controller output | AV4 80% | Maximum limit |
| Regenerated catalyst slide valve differential pressure | AV5 22 KPA | Maximum limit |
| Spent catalyst slide valve differential pressure | AV6 24 KPA | Maximum limit |

The results are vividly illustrated in FIGS. 10–22.

Additional advantages and modification will readily occur to those skilled in the art. The invention in its broader aspects is therefore not limited to the specific details, representative apparatus, and the illustrative examples shown and described herein. Accordingly, the departures may be made from the details without departing from the spirit or scope of the disclosed general inventive concept.

We claim:

1. A method for optimizing the relationship of variables associated with a plant process having inputs and outputs, comprising the steps of:

(a) measuring variables of the process comprising controlled, manipulated, associated and disturbance variables;

(b) employing a model predictive controller comprising a control routine for determining differential moves of the manipulated variables based on the controlled variable(s), one or more of the associated variables, one or more of the disturbance variables, and a permanent constraint target set at an artificially high value, comprising determining manipulated variable differential moves over a predetermined future time horizon to optimize controlled variable deviations with respect to associated setpoints by weighting at least one controlled variable relative to other controlled variables so as to prioritize errors associated with the controlled variables, by penalizing at least one future controlled variable for large manipulated variable movement to balance a reduction of future control error against large manipulated variable movement, by weighting at least one manipulated variable for reducing deviation of the manipulated variable from the target value set artificially high to allow preferential movement of at least one of the manipulated variables over another manipulated variable, and by applying a constraint deviation variable to effectuate deviations outside allowable bounds; and (c) controlling the plant operation in accordance with the differential moves determined in step (b).

2. The method for optimizing the relationship of variables associated with a process as defined in claim 1, wherein the control routine is adapted to solve the objective function:

$$Min\ J=Jcv+J\lambda+Jpc+Jd$$

wherein Min J is a least square value comprising the sum of Jcv, J$\lambda$, Jpc and Jd; such that $$Jcv=CVwate^T(Ax-e)^TCVwate(Ax-e)$$

wherein Jcv is the sum of a weighted squares of deviations in the controlled variables from respective setpoints over a future time horizon, CVwate is a vector of factors for weighting control variable errors relative to each other, A is a matrix of transfer function coefficients relating the controlled variables to the manipulated variables, x is a vector of the differential moves of the manipulated variables and e is a vector of errors between the controlled variables and their respective setpoints;
such that $$J\lambda=x^T\lambda^T\lambda x$$

wherein J$\lambda$ is the sum of weighted squares of the differential moves of the manipulated variables and $\lambda$ is a vector of move suppression factors for penalizing excessively large differential moves of the manipulated variables;
such that $$Jpc=PCwate(PCtrgt-MVstpt)^T(PCtrgt-MVstpt)$$

wherein Jpc is the sum of the weighted squares of the deviations of the manipulated variables from the permanent constraint values, PCwate is a vector of factors for specifying how tightly the permanent constraints are enforced, PCtrgt is a vector of the permanent constraint targets, and MVstpt is a vector of the manipulated variable setpoints;
such that $$Jd=(d^TAVcost^T)(AVcost\ d)$$

wherein Jd is the sum of the weighted squares of the deviations in constraint functions outside their allowable bounds, d is a vector of constraint deviation variables, and AVcost is a vector of relative constraint weights;
wherein the objective function is subject to the limits:

$$0\leq Vmnmov\leq |x|Vmxmov$$

wherein Vmnmov is a vector of minimum differential moves of the manipulated variables and Vmxmov is a vector of maximum differential moves of the manipulated variables; and $$\begin{bmatrix}MVlwbds\\AVlwbds\end{bmatrix}\leq C\begin{bmatrix}x\\d\end{bmatrix}\leq\begin{bmatrix}MVhibds\\AVhibds\end{bmatrix}$$

wherein MVlwbds are vector elements comprising lower bounds of the manipulated variables, AVlwbds are vector elements comprising lower bounds of the associated variables, C is a matrix of transfer function coefficients relating the manipulated and associated variables to the disturbance variables, MVhibds are vector elements comprising upper bounds of the manipulated variables and AVhibds are vector elements comprising upper bounds of the associated variables.

3. A method for optimizing the relationship of variables associated with a plant process having inputs and outputs, comprising the steps of:

(a) measuring variables of the process comprising controlled, manipulated, associated and disturbance variables;

(b) weighting errors associated with at least one controlled variable relative to other controlled variables so as to prioritize errors associated with the controlled variables;

(c) optimizing controlled variable deviations from associated setpoints over a predetermined future time horizon based upon manipulated variable differential moves;

(d) suppressing errors associated with at least one future controlled variable by penalizing for large manipulated variable movement for balancing the reduction of future control error against large manipulated variable movement;

(e) weighting at least one manipulated variable for reducing deviation of the manipulated variable from a permanent constraint so as to allow preferential movement of at least one of the manipulated variables over another manipulated variable;

(f) applying a constraint deviation variable to effectuate associated variable deviations outside allowable bounds; and (g) controlling the plant operation in accordance with the differential moves determined in steps (b) through (f).

4. The method for optimizing the relationship of variables associated with a process as defined in claim 3 wherein the step of optimizing controlled variable deviations comprises calculating the sum of the squares of the deviations of the calculating the sum of the squares of the deviations of the controlled variables with the independent variable being the differential moves of the manipulated variable.

5. The method for optimizing the relationship of variables associated with a process as defined in claim 3 wherein the step of optimizing controlled variable deviations comprises calculating the least squares of the deviations of the controlled variables such that the independent variable includes the differential movement of the manipulated variable.

6. The method for optimizing the relationship of variables associated with a process as defined in claim 3 wherein the step of suppressing errors comprises identifying a preferred move suppression by locating the beginning of an asymptotic decrease of the move sizes prior to a rapid increase in the errors associated with the controlled variable.

7. The method for controlling the inputs and the outputs of a process as defined in claim 3 wherein the step of suppressing errors comprises setting upper, lower and incrementing values for a move of the controlled variable.

8. The method for controlling the inputs and the outputs of a process as defined in claim 3 wherein the step of error suppression comprises suppressing the errors until a steady state is reached for ensuring that the sum of the errors and the sum of the moves have been properly calculated.

9. The method for controlling the inputs and the outputs of a process as defined in claim 3 wherein the step of error suppression comprises determining detailed output including controlled variable-disturbance variable, controlled variable error, associated variable-disturbance variable, feedforward contributions, manipulated variable moves and manipulated variable setpoint projections.

10. The method for controlling the inputs and the outputs of a process having controlled variables, manipulated variables, associated variables and disturbance variables as defined in claim 4 further comprising the steps of:
 (a) testing the process to determine operating outputs associated with operating inputs;
 (b) modeling the process outputs to acquire model response coefficients associating the operating inputs and the operating outputs;
 (c) applying a suppression analysis for determining an initial move suppression tuning parameter associated with at least one manipulated variable associated with the operating inputs and the operating outputs such that the suppression analysis effectuates setpoint changes and disturbance changes;
 (d) applying a control routine for simulating the tuning parameters during setpoint changes, disturbance changes and constrained control situations for determining updated outputs and updated inputs; and
 (e) evaluating the updated outputs and updated inputs for providing supervisory control of the process.

11. The method for controlling the inputs and the outputs of a process as defined in claim 10 wherein the step of testing the process comprises:
 (a) identifying relevant manipulated variables to be perturbed;
 (b) identifying relevant disturbance variables to be perturbed;
 (c) identifying one or more response variables to be collected and analyzed based upon the perturbation of the identified manipulated variables and disturbance variables;
 (d) determining the amplitude of the perturbation to be sufficiently large such that the responses of the process are detectable;
 (e) determining an appropriate sample interval;
 (f) determining an appropriate perturbation frequency;
 (g) determining an appropriate duration of the test;
 (h) performing a pseudo-random binary noise test on the process based upon the identified manipulated variables and disturbance variables.

12. The method for controlling the inputs and the outputs of a process as defined in claim 10 wherein the step of applying a suppression analysis comprises calculating the sum of the errors associated with the controlled variable and the sum of the moves associated with the manipulated variable for determining a set of move suppression values for each manipulated variable.

13. The method for controlling the inputs and the outputs of a process as defined in claim 10 wherein the step of applying a suppression analysis comprises increasing the move suppression to effect decreases in the move sizes of the tuning parameter.

14. The method for controlling the inputs and the outputs of a process as defined in claim 10 wherein the step of applying a suppression analysis comprises identifying a preferred move suppression by locating the beginning of an asymptotic decrease of the move sizes prior to a rapid increase in the errors associated with the controlled variable.

15. The method for controlling the inputs and the outputs of a process as defined in claim 10 wherein the step of applying a suppression analysis comprises setting upper, lower and incrementing values for the move suppression parameter.

16. The method for controlling the inputs and the outputs of a process as defined in claim 10 wherein the step of applying a suppression analysis comprises applying the suppression analysis until a steady state is reached for ensuring that the sum of the errors and the sum of the moves have been properly calculated.

17. The method for controlling the inputs and the outputs of a process as defined in claim 10 wherein the step of applying a suppression analysis comprises determining detailed output including controlled variable error, feedforward contributions, manipulated variable moves, manipulated variable setpoint projections, controlled variable-disturbance variables and associated variable-disturbance variables.

\* \* \* \* \*